3,074,139
METHOD AND APPARATUS FOR LIMITING LOSS OF OVERHEAD MORTAR LINING IN PIPE

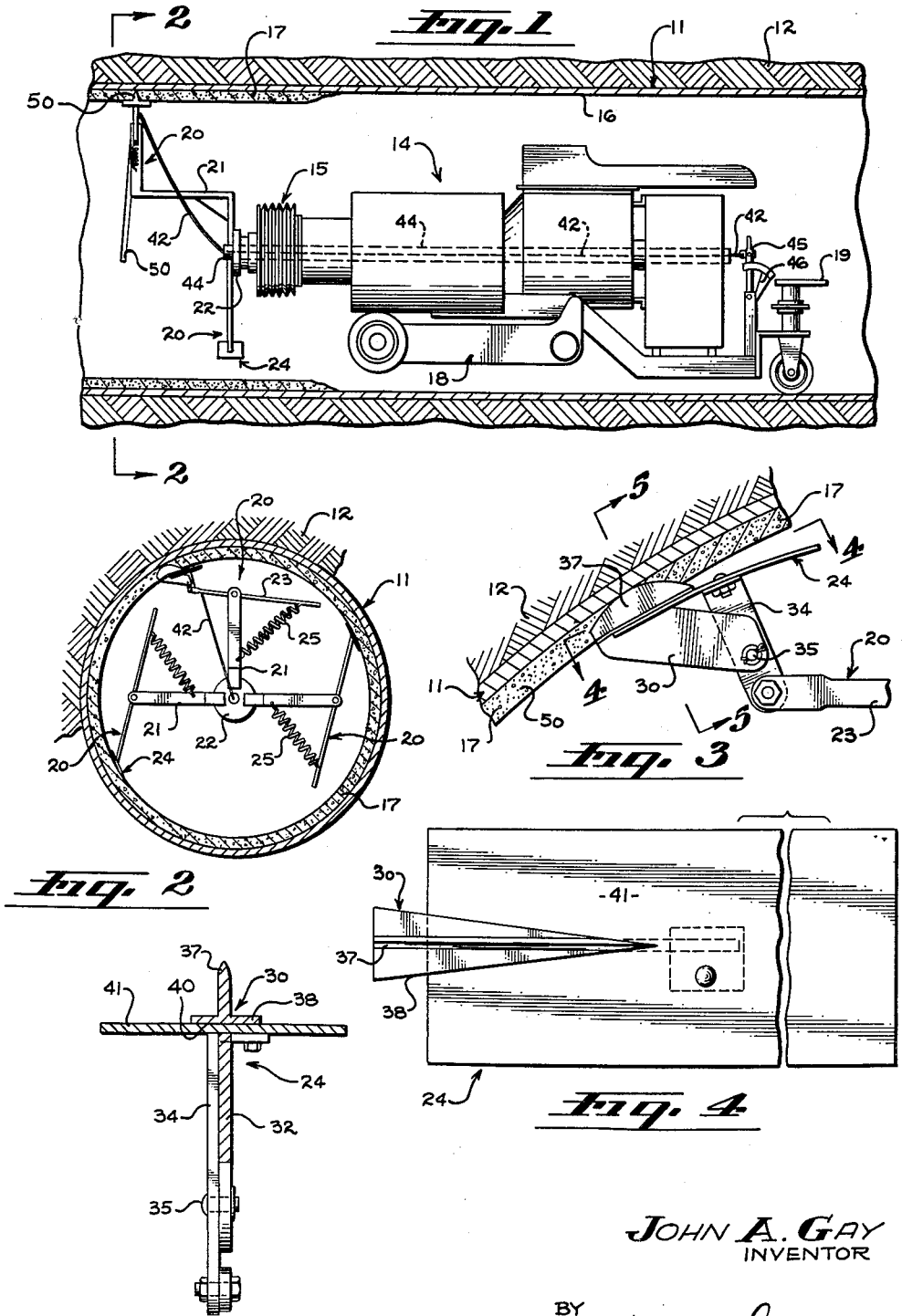

John A. Gay, Wilmington, Calif., assignor to American Pipe and Construction Co., South Gate, Calif., a corporation of Delaware
Filed Oct. 9, 1959, Ser. No. 845,436
2 Claims. (Cl. 25—38)

This invention has to do with the lining of steel pipelines and the like with a layer of cement mortar.

It is common practice to clean old pipelines in the ground and then line them with cement mortar. Where the diameter of the pipe permits, the mortar is usually applied by a centrifugal type lining machine which throws or impels the mortar against the inner wall of the pipeline as the machine advances through the pipe. Such machines embody means for troweling the applied lining material to compact and smooth it. One difficulty in the lining of pipelines by this method is the fact that occasionally the mortar will fail to adhere to some limited area of the upper portion of the pipeline, and in consequence, considerable mortar falls from the upper side of the pipe since once the mortar begins to fall it tends to carry adjacent mortar with it so that the falling mortar peels away from the pipe and falls for a considerable extent longitudinally along the pipe wherever the mortar is still in plastic condition. This of course can result in considerable loss of material and time and greatly increases the cost of the lining operation.

Heretofore, in order to limit migration of the falling mortar it has been the practice to leave gaps or unlined spaces in the mortar at longitudinally spaced intervals along the pipe so that if the mortar does lose adherence and fall away from the pipe, the extent of the fall longitudinally of the pipe is limited by the nearest gap. The difficulty with this practice has been the necessity of filling the gaps by hand at a later period after the mortar has set sufficiently to enable workmen to enter the pipe. Considerable time and labor is expended in this.

An object of the inventon is to provide a novel method of lining pipelines which limits the loss of mortar from the upper interior wall of the pipeline, should the mortar begin to fall therefrom. A further object is to provide such a method which requires only a minimum amount of hand labor to finish the pipe. More particularly, it is an object to provide a method of limiting the loss of mortar from the interior of a pipe which entails scoring the lining at intervals throughout the pipeline immediately after it is applied.

Another object of the invention is to provide novel means for carrying out the method, and in particular, novel means for scoring the lining placed in a pipeline at selected regions along the pipe.

A further object is to provide novel means for scoring a lining placed in a pipeline which can be readily incorporated in a conventional lining machine.

These and other objects will be apparent from the drawing and the following description:

Referring to the drawing, which is for illustrative purposes only:

FIG. 1 is a sectional view through a portion of a pipeline showing a pipe-lining machine embodying the invention in elevation therein;

FIG. 2 is a cross-sectional view on line 2—2 of FIG. 1;

FIG. 3 is a fragmentary elevational view of the scoring device taken in the plane of line 2—2, but on a larger scale; and FIG. 4 is a plan view of the scoring device on line 4—4 of FIG. 3; and FIG. 5 is a sectional view on line 5—5 of FIG. 3.

More particularly describing the invention, numeral 11 generally designates a pipeline which is shown made of metal and buried in the earth 12. Within the pipeline is a centrifugal type of pipe-lining machine designated 14, which includes a rotary dispensing head 15 through which the cement mortar issues and is hurled or thrown against the interior surface 16 of the pipeline 11 to form a lining 17. The machine 14 includes a wheeled carriage 18 which is adapted to be pulled through the pipeline by means of a cable (not shown) attached to the forward end portion 19.

The lining machine is shown provided with a plurality of troweling members 20, each of which includes a substantially radially extending arm 21 attached to a rotary head 22 and a pivotally mounted bar 23 carrying a trowel 24 at its outer end. The members 21 and 23 are connected by a tension spring 25 which serves to yieldably urge the trowel into engagement with the applied lining 17. As can be seen in FIG. 1, two of the three arms 21 are stepped so as to position the trowels in spaced relation longitudinally of the machine.

For the purpose of scoring the lining at desired intervals, one of the trowels 24 is provided with a scoring device 30 which is detachably secured in place. The scoring device itself has a main plate portion 32 which is apertured so that it can be detachably secured to the standard portion 34 of the trowel by means of a pin 35. The scoring device includes a convex blade 37 and a relatively narrow delta-shaped tapering fin 38 on each side of the base of the blade. A slot 40 is provided underlying the fins to receive the blade 41 of the trowel.

In order to retract the scoring device from the wall of the pipe, a cable 42 is attached to the rod 23 adjacent the trowel. The cable extends through a central tube 44 extending longitudinally of the machine and emerges at the forward end of the machine where it is attached to a liner 45. The latter can be adjusted in a bracket 46 to retract the scoring device at will.

In the method of lining the pipeline, the mortar is applied by the lining machine through the head 15, after which the applied lining is troweled smooth by the trowels 24 which rotate as the machine advances. However, the trowel with the scoring device is held retracted out of engagement with the lining. At intervals as the machine advances through the pipe, the operator releases the cable 42 to permit the scoring device to come into play, and since this rotates with the rotor head 22, a line or cut 50 (FIG. 3) is formed in the mortar, the mortar being in effect cut or separated by a narrow line of parting down to the metal pipeline itself. After the scoring device has completed one revolution it is retracted until the machine has advanced sufficiently to warrant its use again.

After the mortar has set in the pipeline sufficiently to enable workmen to enter, the score marks are filled by hand and smoothed over.

Although I have illustrated and described a preferred form of my invention, I contemplate that various changes and modifications can be made therein without departing from the invention, the scope of which is indicated by the following claims.

I claim:

1. In a machine for lining pipelines with cement mortar having means for applying mortar to the interior surface of the pipeline and means for immediately thereafter troweling the same, means for scoring the troweled lining, comprising a rotary head on the machine, an arm fixed to the head, a rod pivotally mounted intermediate its ends on said arm, a spring connecting said rod and arm and yieldably urging one end of said rod toward said pipeline, a scoring device carried by said one end of said rod, a cable attached to said rod on the portion thereof between said scoring device and the point of pivotal mounting of the rod, a tube extending longitudinally through said machine, said cable being threaded through said tube, and means at the far end of said tube for adjusting said cable to retract said scoring device.

2. In a method of lining the interior of a pipe line with a coating of cement mortar, the steps of progressively applying a layer of mortar to the interior surface of the pipe line in a direction axially thereof, progressively troweling the applied mortar immediately following its application, circumferentially scoring the troweled lining immediately after it has been troweled at intervals spaced longitudinally along the pipe line to sectionalize the lining for thus limiting to the nearest gap the fall of mortar which loses adherence, and subsequently filling the scored marks after the lining has set.

References Cited in the file of this patent
UNITED STATES PATENTS

| | | |
|---|---|---|
| 1,398,815 | Trusty et al. | Nov. 29, 1921 |
| 2,297,099 | Crom | Sept. 29, 1942 |
| 2,399,321 | Butler | Apr. 30, 1946 |
| 2,758,352 | Perkins | Aug. 14, 1956 |
| 2,819,508 | Martin | Jan. 14, 1958 |